United States Patent [19]

Herdzina et al.

[11] 4,273,507
[45] Jun. 16, 1981

[54] TRANSFER MECHANISM

[75] Inventors: Frank J. Herdzina, Schaumburg; Robert P. Vandlik, Mount Prospect, both of Ill.

[73] Assignee: American Can Company, Greenwich, Conn.

[21] Appl. No.: 966,198

[22] Filed: Dec. 4, 1978

[51] Int. Cl.³ ............................................. B21J 13/08
[52] U.S. Cl. ..................................... 414/750; 414/226; 414/753; 294/104; 113/1 F; 113/114 R
[58] Field of Search ............... 414/750, 224, 225, 222, 414/226, 753; 294/31 R, 30, 104; 113/1 F, 114 R, 114 BA, 114 BB, 114 BC, 114 BD, 114 BE; 72/405

[56] References Cited

U.S. PATENT DOCUMENTS

| 741,816 | 10/1903 | McKinniss | 294/104 X |
|---|---|---|---|
| 1,284,323 | 11/1918 | Hansen | 294/30 X |
| 3,295,701 | 1/1967 | Alexander | 414/226 |
| 3,583,745 | 6/1971 | Stuart | 294/31 R |
| 3,834,213 | 9/1974 | Henzler et al. | 414/225 X |

Primary Examiner—Stephen G. Kunin
Assistant Examiner—Terrance L. Siemens
Attorney, Agent, or Firm—Robert P. Auber; Stuart S. Bowie; George P. Ziehmer

[57] ABSTRACT

An apparatus for the high speed transfer of workpieces in a multi-station machine. The stations are located in a common plane, in axial alignment and are equidistantly spaced. The apparatus utilizes a carrier assembly, which incorporates a pair of parallel barrels with a shaft received within the bore of each barrel. A series of confronting openings, which expose the shafts, are formed in the barrel walls at intervals which correspond with the spacing of the machine stations. A pair of gripping fingers are located at each barrel opening. A first finger is affixed to the barrel, extending outwardly therefrom, while a second finger which is affixed to the shaft, extends through the barrel wall opening to cooperate with the first finger. By pivoting the barrels in unison, with respect to the shafts, which are rotatably locked, the fingers can be caused to assume either a gripping or releasing attitude. A drive pivots the barrels and cooperatively reciprocates the carrier assembly to advance the workpiece from station to station in synchronization with the operation of the machine.

5 Claims, 5 Drawing Figures

TRANSFER MECHANISM

BACKGROUND OF THE INVENTION

The transfer of work between the stations of a multi-stationed machine, such as a press for the conversion of can ends, determines to a great degree the speed at which the machine can operate. The problem of work transfer is compounded when the orientation of the workpiece must be controlled throughout the operation.

One type of mechanism which has been employed for the transfer of workpieces in a multi-station machine is the reciprocating slide which is equipped with a series of pockets or cavities to hold the workpiece during its transfer from station to station. The slide is constructed in two segments which are brought together to engage the workpiece and moved apart to release it. Separate sets of guide bars are employed to direct the longitudinal movement of the slides in transferring work between stations and to direct the in and out transverse movement of the slide segments in engaging and releasing the workpieces. The use of multiple sets of guide bars imposes definite limitation on both the speed of transfer and the control of the workpiece.

Alternative structures have been suggested which address the problem of workpiece control by employing gripping members which are spring loaded or otherwise biased to positively engage the workpiece. These structures tend to be complex with many working members, which must be adjusted and maintained, to ensure adequate control without distorting or damaging the workpiece. The complexity and mass of these transfer mechanisms serve to constrain the operating speed of the machine and at the same time add to the problems of maintenance, lubrication and noise. Finally these mechanisms are not readily adaptable to handling changes in workpiece size or shape.

Accordingly it is an object of this invention to provide a rapid transfer mechanism which enables work to be transferred from station to station in a multi-station machine without loss of orientation.

It is also an objective of this invention to provide a transfer mechanism with a minimum of working members which is simple but highly effective.

Finally, it is an objective of this invention to provide a transfer mechanism which is capable of handling a variety of workpieces without damaging the workpiece or introducing unnecessary contamination thereto.

The following patents are considered by the inventor to be material to the examination of the application:

| U.S. 3,620,381 | McCaughey | Nov. 16, 1971 |
| U.S. 3,528,575 | McCaughey | Sept. 15, 1970 |
| U.S. 3,521,760 | Wallis | July 28, 1970 |
| U.S. 3,430,782 | Hendel | March 4, 1969 |
| U.S. 3,397,799 | Wallis | Aug. 20, 1968 |
| U.S. 3,921,788 | Roberson et al | Nov. 25, 1975 |

SUMMARY OF THE INVENTION

It may be seen that the aforementioned objects of the invention may be attained in an apparatus for transferring workpieces which includes a means for support and a carrier with a barrel which is slidably and rotatably mounted on the support means. The barrel has at least one opening in its wall and a shaft received within the barrel so that they are in rotatable relationship one to the other. A pair of fingers are mounted on the carrier, with the first finger being mounted on the barrel proximate to the wall opening and extending radially outward therefrom, and the second finger being mounted on the shaft, extending through the wall opening and radially outward for gripping cooperation with the first finger. The barrel and shaft are relatively pivotable one to the other, from a first position where the fingers lie closely adjacent to one another to a second position where the fingers are spread. In this way, the fingers may cooperatively grip the workpiece in the first position and release the workpiece in the second position.

It is preferable that the apparatus for the transfer of workpieces include a second carrier parallel to the first with the respective pairs of fingers of the carriers disposed in a confronting relationship so that the pairs of fingers may act cooperatively to grasp the opposite sides of the workpiece. It is also desirable to employ a tie member which fixedly inter-engages the shafts of the two carriers to prevent their rotation and also includes a means for simultaneously pivoting the two barrels. It is further desirable that the two barrels be journaled in a common housing to form an assembly, with the barrels extending outward therefrom, with the wall openings transversely aligned. Further, it is desirable that a drive means be provided for simultaneously pivoting the barrels and for reciprocating the carrier assembly in the axial direction of the barrels. In this way, the carrier assembly may be moved from a first position in which the first and second fingers of each pair are in a cooperative gripping relationship to a second axially displaced position of the carrier assembly in which the fingers of each pair are spread apart, thereby transferring the workpiece from a first position to a second position where the workpiece is released.

The apparatus may be advantageously employed for transferring can ends between equidistantly spaced stations in a multi-station end press, where the two barrels of the carrier assembly have a plurality of equidistantly spaced, axially aligned, openings formed in their confronting walls portions at locations which correspond to the stations of the press, with a pair of fingers disposed at each opening.

DETAILED DESCRIPTION OF THE ILLUSTRATED EMBODIMENT

Figure 1:
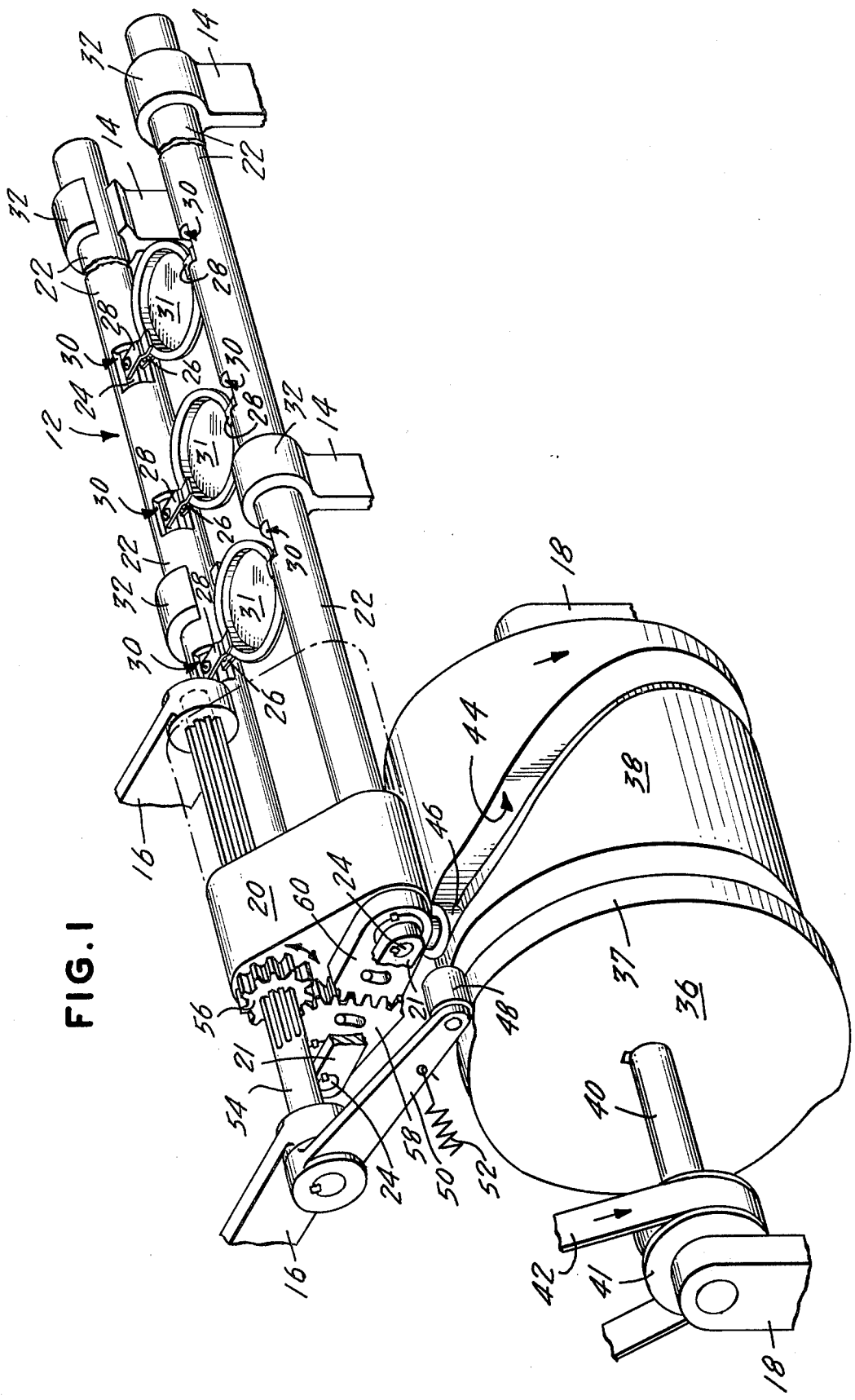
FIG. 1 is a fragmentary perspective view of a transfer apparatus embodying the present inventions.

Turning now is detail to FIG. 1 of the appended drawings, therein illustrated is transfer apparatus embodying the present invention, and consisting of a carrier assembly, a drive train and frame elements.

The carrier assembly number 12 includes a housing 20 which is slidably mounted on a splined shaft 54 which, in turn, is pivotably supported by end brackets 16. Extending from one side of the housing 20 are two parallel barrels 22, which are pivotably supported at one end in fixed axial positions therewithin, and which are supported outwardly thereof within the C-shaped head portions 32 of stanchions 14.

Secured on the inner ends of the barrels 22, and in meshing inter-engagement are sector gears 58, 60. Gear 58 is also in meshing engagement with pinion 56, the latter being coupled to the housing 20 and slidably mounted on the splined shaft 54, with its internal teeth meshing with the splines thereof. Extending through each of the barrels 22 is a shaft 24, the inner ends of which are joined by a tie bar 21 (the central portion of which is broken away in FIG. 1 to expose underlying structure), to which they are keyed so as to lock the shafts 24 against rotation.

The barrels 22 have a series of equidistantly spaced and axially aligned openings 30 formed in their confronting wall portions, the openings 30 of the two barrels 22 also being in transverse alignment with one another. As is best seen in FIGS. 2–5, a gripping finger 26 is secured to the surface defining the lower edge of each barrel opening 30, and extends radially outwardly therefrom, with opposing fingers 26 projecting generally toward one another. Aligned over each finger 26, and secured to a flat formed on the shafts 24 is a complementary finger 28, the finger 28 being positioned to project through the openings 30 for cooperation with the fingers 26. As will readily be appreciated, pivoting of the barrels 22 will cause the fingers 26 secured thereto to open and close with the stationary fingers 28 mounted on the immobile shafts 24, thereby enabling gripping and releasing co-action therebetween.

Below the carrier assembly is a driving mechanism, consisting of an edge cam 36 and a drum cam 38, which are adjacently mounted on, and keyed to, a shaft 40. The shaft 40 is supported by posts 18, and it fixedly carries a pulley 41, which takes power through the belt 42 from a source, (not shown), and transmits it to the shaft 40.

The edge cam 36 has a circumferential cam surface 37 on which rides a cam follower wheel 48, the latter being urged against the surface 37 by the coil spring 52. The opposite end of the rocker arm 50 is affixed to the splined shaft 54, and the cam surface 37 is configured to cause rocking movement of the arm 50, and thereby turning of the shaft 54.

Formed in the cylindrical surface of the drum cam 38 is a track 44, within which rides a cam follower lug 46, which depends from the housing 20 and projects thereinto. The track 44 is configured to cause lateral reciprocation of the carrier assembly between the full line and phantom line positions shown in FIG. 1.

In operation, power is transmitted (such as from the prime mover of the machine in which the apparatus is installed) to the shaft 40, causing the tandem cams 36, 38 to revolve therewith. Engagement of the lug 46 in the track 44 of the drum cam 38 effects the lateral shifting of the housing 20 on the splined shaft 54 which, in turn, causes the barrels 22 and the shafts 24 therewithin to move back and forth, with the barrels 22 being slidably guided by the head portions 32 and with the fingers 26, 28 passing through the slots 34 thereof. In timed relation to the reciprocal movement of the carrier assembly, the edge cam 36, effects the opening and closing of the fingers 26, 28. Thus, when the follower wheel 48 bears upon a raised section of the surface 37, as shown in FIG. 1, the pinion 56 assumes its most counterclockwise position which, in turn, causes the barrels 22 to pivot so as to establish the maximum spread between the fingers 26 mounted thereon and the fingers 28 mounted on the shafts 24, (as is shown also in FIGS. 2 and 5). As the cam 36 rotates, a depressed section of its surface 37 will be presented to the wheel 48, causing the arm to rock downwardly (under the biasing force of spring 52) and, in turn, rotating the pinion 56 in a clockwise direction. The barrels 22 and the attached fingers 26 will thereby pivot from the positions of FIG. 2 to those of FIG. 3, so as to lift the end blank 31 from the idle station 70 and securely grip it, by co-action with the associated fingers 28.

Figure 2:
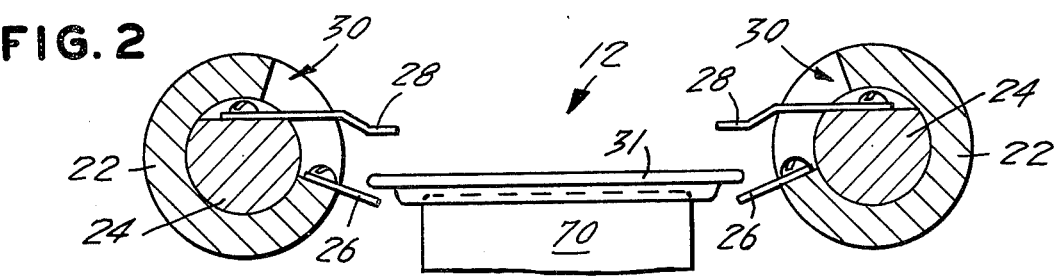
FIG. 2 is a cross sectional view through the first station of FIG. 1, drawn to an enlarged scale, and additionally including a workpiece and a fragmentarily illustrated pedestal.
Figure 3:
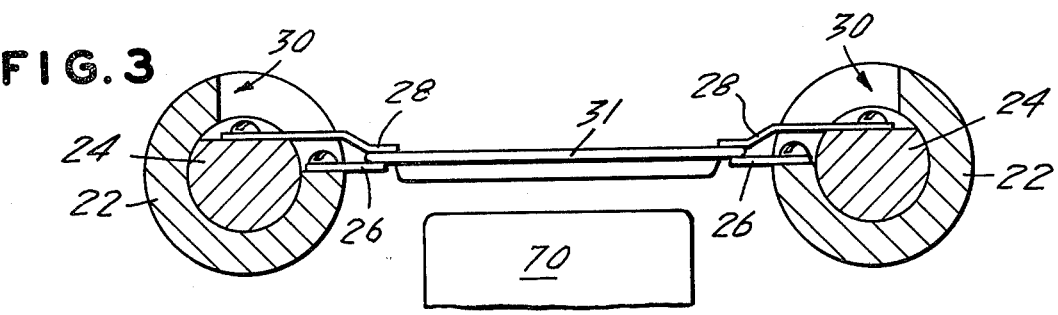
FIG. 3 is a view similar to FIG. 2 but showing the gripping fingers engaging the workpiece and elevated above the pedestal.
Figure 4:
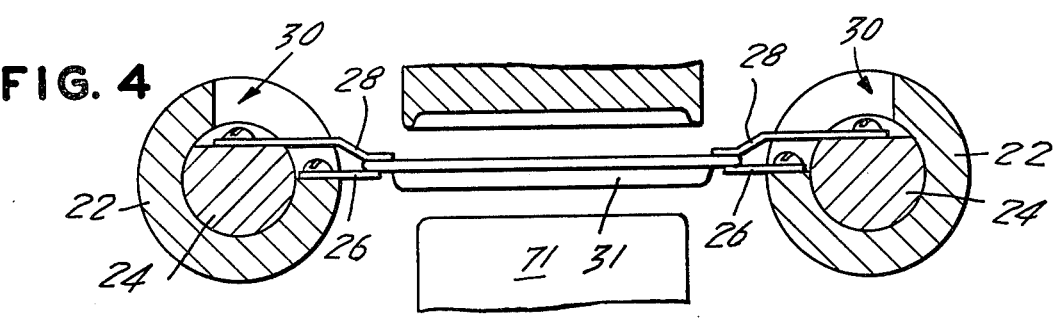
FIG. 4 is a view similar to FIG. 3 taken through a subsequent station of the machine to which the workpiece has been transferred.
Figure 5:
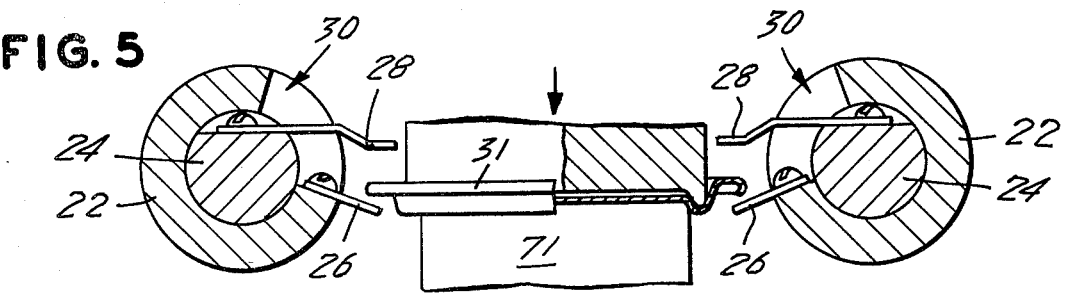
FIG. 5 is a view similar to FIG. 4 showing the fingers in a spaced-apart attitude with the workpiece released therefrom and being acted upon by tooling provided thereat.

While the blank 31 is so engaged, the track 44 of the drum cam 38 will cause the carrier assembly to shift laterally, transferring the blank from the idle station 70 of FIGS. 2 and 3 to that of the first forming station 71 of FIGS. 4 and 5. Thereat (as shown in FIG. 5), the barrels 22 will again be pivoted (by contact of the wheel 48 upon a high section of the surface 37), so as to release the blank 31 and permit the punch and die of forming station 71 to operate thereon. As will be appreciated, the track 44 is configured to afford appropriate dwell periods, during which the workpiece can be gripped and released with the carrier assembly remaining stationary.

End blanks 31 are supplied to the transfer mechanism from a stacking frame which may be of conventional manufacture such as that shown in U.S. Pat. No. 4,019,452.

While the instant transfer mechanism has been described in relation to the transfer of can ends in a conversion press, it should be appreciated that the apparatus may be readily adapted to handle other waferlike articles such as silicon slices or mica-lamination used in electrical circuitry.

Additionally, it should be apparent that while the carrier shafts of the illustrated embodiment are shown to be rotationally locked by means of a tie bar, in other environments it might be advantageous to rotationally lock the carrier barrels and pivot the carrier shafts. In still other environments it might be advantageous to pivot both the barrels and the shafts, or to pivot one barrel more than the other, thereby surrendering control of one side preferentially.

The fingers which are readily replaceable may be specially contoured or sized to assist in the control of and or release of the workpieces, nor need both pair of fingers necessarily be the same size or contour. At high speeds and where registration is particularly critical tooling equipped with vacuum holding means may be advantageously employed.

Other modifications will be apparent to those skilled in the art.

Thus it can be seen that the instant invention affords a means for the transfer of work in a multi-station machine which is capable of high speed operation while retaining positive control over the workpiece.

It may further be seen that the instant apparatus has a novel structure which is simple, but highly effective.

Finally, it may be seen that the instant apparatus is capable of handling a variety of workpieces by the simple replacement of gripping fingers.

What is claimed is:

1. An apparatus for transferring workpieces including:
   (a) support means;
   (b) carrier means comprising;
      (i) a barrel, slidably and rotatably mounted on said support means and having at least one axial opening in the wall thereof;
      (ii) a shaft disposed in said barrel for relative rotation therein;
      (iii) a pair of fingers;
      a first one of said fingers being mounted on said barrel proximate to said opening and extending radially outwardly therefrom;
      the second of said fingers being mounted on said shaft and extending radially outwardly through said opening for gripping cooperation with said first finger;
      (iv) said barrel and shaft being relatively pivotable from a first position in which said fingers may lie closely adjacent to one another to a second position in which said fingers are spread, whereby said fingers may cooperatively grip said workpiece in said first position and may release said workpiece in said second position; and
   (c) means for lateral reciprocation of said carrier means from said gripping position to said releasing position thereby effecting transfer of said workpiece.

2. The apparatus of claim 1 wherein said apparatus additionally includes a second carrier means, said second carrier means being spaced from said first carrier means with one pair of fingers of said carrier means disposed in opposing relationship, whereby said fingers cooperate to grasp opposite sides of the workpiece.

3. The apparatus of claim 2 wherein said apparatus additionally includes a tie member fixedly interengaging the shafts of said first and second carrier means to prevent rotation thereof, and further includes means for simultaneously pivoting said barrels thereof.

4. An apparatus for transferring workpieces comprising:
   (a) support means;
   (b) carrier means slidably mounted on said support means comprising:
      (i) a housing;
      (ii) two barrels, each having at least one opening, and being supported by said housing to extend outwardly in a parallel relationship therefrom with said openings transversely aligned;
      (iii) a shaft within the bore of each of said barrels being pivotable thereabout;
      (iv) first finger means mounted on each of said barrels proximate said openings thereof and extending radially outwardly therefrom, and second finger means mounted on each of said shafts and extending radially outwardly through said opening of the associated barrel, said associated first and second finger means being operable to grip said workpiece; and
   (c) drive means mounted on said support means for pivoting said barrels and for reciprocating said carrier means in the axial direction of said barrels, whereby said carrier means may be moved from a first position in which said first and second finger means are in a gripping relationship, to a second axially displaced position of said carrier means in which said fingers means may be disposed in a non-gripping relationship, to thereby transfer a workpiece from said first position to said second position, and to effect the release of the workpiece thereat.

5. An apparatus for transferring can ends between equidistantly spaced stations in a multi-station end press comprising:
   (a) support means;
   (b) a carrier assembly slidably mounted on said support means, and including:
      (i) a housing;
      (ii) two barrels having a plurality of equidistantly spaced, axially aligned openings formed in the confronting wall portions thereof at locations corresponding to the stations of the press, said barrels being journaled in said housing to extend outwardly in a parallel relationship therefrom with said openings transversely aligned;
      (iii) two shafts, one of which is received within the bore of each of said barrels, with said barrels being pivotable thereabout;
      (iv) means fixedly engaging said shafts against rotation;
      (v) a first finger mounted on each of said barrels proximate to each of said openings thereof and extending radially outward therefrom, and a second finger mounted on each of said shafts and extending radially outwardly through each of said openings of the associated barrel, said first and second fingers constituting a plurality of pairs and being disposed to cooperatively grip said can end with said pairs on opposite sides thereof; and
   (c) drive means mounted on said support means for simultaneously pivoting said barrels and for reciprocating said carrier assembly in the axial direction of said barrels, whereby said carrier may be moved from a first position in which said first and second fingers of said pairs are in a cooperatively gripping relationship to a second axially displaced position of said carrier in which fingers of said pairs may be disposed to a spread relationship to thereby transfer said can end from said first position to said second position, and to effect the release of the workpiece thereat.

* * * * *